Feb. 17, 1959   H. KLOCKGETHER ET AL   2,874,046
PROCESS FOR THE RETREATMENT OF FOILS CONSISTING OF HIGHLY
POLYMERIC SUBSTANCES FOR THE APPLICATION
OF HYDROPHILIC COLLOIDS
Filed June 21, 1956

*Fig. 1.*

- EMULSION LAYER
- GELATINE COATING
- INTERMEDIATE LAYER
- SUPPORT LAYER

*Fig. 2.*

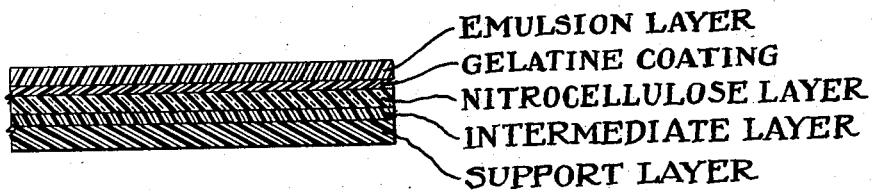

- EMULSION LAYER
- GELATINE COATING
- NITROCELLULOSE LAYER
- INTERMEDIATE LAYER
- SUPPORT LAYER

INVENTORS
HELFRIED KLOCKGETHER,
ERWIN MÜLLER and
BY ARMIN OSSENBRUNNER

Connolly and Hutz

ATTORNEYS

United States Patent Office 2,874,046
Patented Feb. 17, 1959

2,874,046

PROCESS FOR THE RETREATMENT OF FOILS CONSISTING OF HIGHLY POLYMERIC SUBSTANCES FOR THE APPLICATION OF HYDROPHILIC COLLOIDS

Helfried Klockgether, Leverkusen, Erwin Müller, Leverkusen-Bayerwerk, and Armin Ossenbrunner, Leverkusen, Germany, assignors to AGFA Aktiengesellschaft Application June 21, 1956, Serial No. 592,858
Claims priority, application Germany June 25, 1955
8 Claims. (Cl. 96—87)

The present invention relates to subbing-layers for films and foils of hydrophobic plastics.

Various processes are known for the pretreatment of film supports consisting of high molecular condensation products of terephthalic acid and glycol and other hydrophobic film forming plastics before coating them with photographic silver halide emulsion layers. One feature which is common to these processes is that thin intermediate or subbing layers are applied between the support and the emulsion layer for producing an adequate bonding effect, which layers are moreover provided with a thin coating from a gelatine solution in predominately organic solvents.

For example, according to one known process, photographic film supports are provided with intermediate layers consisting of polyesters which are soluble in trichloroethylene and which are obtained from terephthalic acid alone or with concurrent use of saturated aliphatic dicarboxylic acid having 4 to 16 carbon atoms, and glycol alone or with concurrent use of polymethylene glycol or polyethylene glycol. This intermediate layer is then treated with a gelatine solution and is thereafter coated with a photographic emulsion.

The standards to be set for such an intermediate layer are very varied. On the one hand, it should bond firmly with the film support, and this generally presupposes an incorporation into the surface and thus a solubility in the solvents swelling the film material, while on the other hand, the gelatine subbing layer or also an additional intermediate layer, for example a nitrocellulose intermediate layer, should adhere to the first-mentioned intermediate layer; finally the applied intermediate layer film should have a strength corresponding to that of the film material. Assuming all these properties, after evaporation of the main quantity of the solvent used in the application, the product should not show a tendency to tackiness. The substance used for such an intermediate layer must moreover dry out to form a completely crystal-clear film and should not have any disadvantageous photographic effects. Not all these requirements are met with the terephthalic acid polyesters previously proposed, or alternatively they are not always met to a sufficient degree. In particular, the bonding of the layer is frequently insufficient.

It has now been found that an effective layer bonding can be produced if the substances used for producing one or more intermediate layers are unsaturated polyesters of aromatic compounds with two aliphatically bonded hydroxy groups and unsaturated aliphatic dicarboxylic acids, it being possible for the polyesters if desired also to contain additional radicals of saturated aliphatic or aromatic dicarboxylic acids.

The unsaturated polyesters can be obtained by using glycols of the following general formulae:

(1)          HO·R—O·X—OR·OH (2) 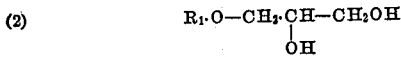

in which X represents a molecule component containing at least one aromatic nucleus, for example phenylene, diphenylene, diphenylene methane, diphenylene dialkyl methane, diphenylene oxide, diphenylene sulfone, naphthylene or a radical of the formula:

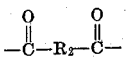

wherein $R_2$ stands for an aromatic radical, for example phenyl, diphenyl, naphthyl, and may have the same meaning as X.

R stands for alkylene, such as for example ethylene or propylene, $R_1$ stands for aryl or aralkyl, such as for example phenyl, benzyl, naphthyl, diphenyl, diphenyl methane, diphenyldimethylmethane.

Such glycols are for instance terephthalic acid diglycol ester, hydroquinone di($\beta$-hydroxyethyl)ether, 4,4'-di-($\beta$-hydroxyethyl)diphenylether, 4,4'-di-($\beta$-hydroxyethyl)-diphenylsulfonether, glycerinemonophenylether, glycerinemonodiphenylether.

Suitable aliphatic unsaturated dicarboxylic acids are for example maleic acid, fumaric acid, itaconic acid. These acids can if desired also be used in the form of their esters, such as for example methyl or ethyl ester, or their anhydrides, such as for example maleic anhydride. Other aliphatic or aromatic dicarboxylic acids can also be concurrently condensed, such as malonic acid, succinic acid, adipic acid, sebacic acid, phthalic acid, terephthalic acid.

The condensation of the said components takes place according to known methods, by the said components being heated in an inert atmosphere to temperatures of approximately 120 to 210°, and being thereafter subjected to a vacuum treatment at elevated temperature, which is generally up to 210° C. The aliphatic ethylenically unsaturated acids and the glycols are preferably applied in equimolecular quantities, whereas the other acids may be used in quantities of about 10–50 mol percent as calculated on the unsaturated aliphatic acids. The acid and hydroxyl numbers of these polyesters are generally lower than 50, the acid number is kept preferably between 20 and 30.

The unsaturated polyesters indicated above are soluble in tetrachloroethane, methylene chloride and other chlorinated hydrocarbons, and also in dioxane, acetone and other ketones, but on the other hand they can swell to a high degree in acetic ethyl ester, butyl acetate, benzene and allied solvents, but they are only slightly swellable in alcohols.

The products are advantageously applied to the film surface from at least a 3% solution in one of the aforementioned solvents, using conventional methods. The choice of the solvent depends upon the film support which is used. It should certainly swell this foil, but it should also not have too strong a dissolving power.

It is therefore expedient to use tetrachloroethane for foils of condensation products of terephthalic acid and glycol, mixtures of acetone and esters for polyvinyl chloride or copolymers containing vinyl chloride, and mixtures of methylene chloride and esters for a foil the film forming agent of which consists of a polycarbonate of di-monohydroxyarylene alkanes according to copending application Serial No. 577,362, filed April 10, 1956 and Belgian Patent 532,543, and also for foils of cellulose esters. On the first intermediate or subbing layer applied in this manner there can be coated by one of the conventional methods a gelatine subbing layer, but, particularly for the production of a good wet bonding, it is advisable to apply a thin nitrocellulose intermediate layer, which in turn is thereafter provided with a gelatine subbing layer.

In order to improve the bonding effect, especially with subsequent application of a nitrocellulose lacquer layer, it is frequently desirable to add some nitrocellulose lacquer to the polyester layer.

The process is hereinafter to be explained by reference to a number of examples.

*Example 1*

(A) A foil consisting of a polyester of terephthalic acid and glycol is treated with a 5% solution of a polyester of terephthalic acid diglycol ester and maleic anhydride in tetrachloroethane. This polyester having an acid number of 30 is obtained by thermal esterification in inert atmosphere of 127 g. of terephthalic acid diglycol ester and 49 g. of maleic anhydride.

(B) Thereafter, a nitrocellulose lacquer layer is applied from a solution consisting of:

1.5 g. of nitrocellulose
15 cc. of acetic ester,
25 cc. of butyl acetate,
60 cc. of ethanol.

On this layer there is coated a thin subbing layer from a solution consisting of:

10 g. of gelatine,
63 cc. of water,
16 cc. of phthalic acid solution (10% in methanol)
70 cc. of formaldehyde solution (1% in methanol)
800 cc. of methanol.

The foil thus treated is cast with a silver halide emulsion. This emulsion adhered very satisfactorily before, during and after the processing of the material in the photographic baths.

*Example 2*

A foil of a polycondensation product of 4,4'-dihydroxydiphenyl-dimethyl methane and phosgene produced according to Belgian Patent 532,543 is treated with the following solution and thereafter dried:

(A) 5 g. of polyester which is obtained by the process according to Example 1, by condensation of 127 g. of terephthalic acid diglycol ester,
24.5 g. of maleic anhydride and
37 g. of phthalic anhydride, (acid number 25) in
30 cc. of methyl acetate,
70 cc. of methylene chloride.

(B) Thereafter, a nitrocellulose layer is applied from a solution of:

1.5 g. of nitrocellulose,
15 cc. of acetic ethyl ester,
25 cc. of butyl acetate,
60 cc. of ethanol.

(C) On this layer there is coated a solution of:

10 g. of gelatine,
63 cc. of water,
16 cc. of phthalic acid solution (10% in methanol)
70 cc. of formaldehyde solution (1% in methanol)
800 cc. of methanol.

The further procedure is the same as in Example 1.

*Example 3*

A foil of polyvinyl chloride is treated with the following solution:

(A) 2.5 g. of a polyester, which is obtained by heating 158 g. of diphenyldimethyl methane-4,4'-dihydroxyethyl ether, and 49 g. of maleic anhydried, to temperature of 120–210° in inert atmosphere and subsequent vacuum treatment at about 210° (acid number 28), 2 g. of nitrocellulose, 70 cc. of methyl acetate, 30 cc. of ethyl acetate.

(B) Thereafter, a nitrocellulose layer is applied from a solution of:

1.5 g. of nitrocotton,
15 cc. of acetic acid ethyl ester,
25 cc. of butyl acetate,
60 cc. of ethanol.

On this layer there is coated a solution of:

(C) 10 g. of gelatine, 63 cc. of water, 16 cc. of phthalic acid solution (10% in methanol), 70 cc. of formaldehyde solution (1% of methanol), 800 cc. of methanol.

The further procedure is the same as disclosed in Example 1.

Fig. 1 is a cross section of a film material comprising a film support, an intermediate layer of a film forming agent as defined by the claims, a gelatine coating and an emulsion layer.

Fig. 2 is a cross section of a similar structure but including a nitrocellulose layer between the intermediate layer and the gelatine coating.

What we claim is:

1. A photographic material comprising a hydrophobic film base and a thin layer coated on said film base said thin layer comprising a film forming agent consisting essentially of a polyester of an alpha-beta ethylenically unsaturated aliphatic dicarboxylic acid and a glycol selected from the group consisting of the compounds having the following general formulae:

(1) $$HO \cdot R \cdot O \cdot X \cdot O \cdot R \cdot OH$$

(2) $$R_1 - O \cdot CH_2 \cdot CH \cdot CH_2 OH$$
$$\qquad\qquad\qquad |$$
$$\qquad\qquad\qquad OH$$

wherein X represents a bivalent organic radical containing at least one aromatic nucleus, R represents alkylene, and $R_1$ stands for a monovalent organic radical containing at least one aromatic nucleus.

2. The photographic material of claim 1 wherein a thin gelatine layer is coated on said thin layer.

3. The photographic material of claim 2 wherein a thin nitrocellulose layer is provided between said thin gelatine layer and said thin layer.

4. The photographic material of claim 2 wherein a silver halide emulsion layer is coated on said gelatine layer.

5. The photographic material of claim 3 wherein a silver halide emulsion layer is coated on said gelatine layer.

6. The photographic material of claim 1 wherein said polyester also contains radicals of at least one additional dicarboxylic acid selected from the group consisting of saturated aliphatic dicarboxylic acids and aromatic dicarboxylic acids.

7. The photographic material of claim 1 wherein said film forming agent includes nitrocellulose.

8. The photographic material of claim 1 in which the acid is selected from the class consisting of maleic acid, fumaric acid and itaconic acid.

References Cited in the file of this patent

UNITED STATES PATENTS

| | | |
|---|---|---|
| 2,334,215 | Nadeau et al. | Nov. 16, 1943 |
| 2,687,430 | Snow et al. | Aug. 24, 1954 |
| 2,698,341 | Saner | Dec. 28, 1954 |
| 2,762,789 | Fisher et al. | Sept. 11, 1956 |